(12) United States Patent
Heine

(10) Patent No.: US 7,464,776 B2
(45) Date of Patent: Dec. 16, 2008

(54) MOTORIZED VEHICLE

(75) Inventor: Bernhard Heine, Marshfield, MA (US)

(73) Assignee: Textron Innovations, Providence, RI (US)

( * ) Notice: Subject to any disclaimer, the term of this patent is extended or adjusted under 35 U.S.C. 154(b) by 146 days.

(21) Appl. No.: 11/449,594

(22) Filed: Jun. 9, 2006

(65) Prior Publication Data

US 2006/0290093 A1    Dec. 28, 2006

Related U.S. Application Data

(60) Provisional application No. 60/689,054, filed on Jun. 10, 2005.

(51) Int. Cl.
*B62D 49/06* (2006.01)
*B62M 7/14* (2006.01)
(52) U.S. Cl. ................ 180/11; 180/14.1; 180/313
(58) Field of Classification Search .......... 180/11, 180/6.5, 14.1, 14.4, 209, 6.48, 313; 280/33.992, 280/481
See application file for complete search history.

(56) References Cited

U.S. PATENT DOCUMENTS

| | | | | |
|---|---|---|---|---|
| 2,425,948 A | * | 8/1947 | Lucien | 180/11 |
| 2,822,055 A | * | 2/1958 | Ludowici | 180/14.1 |
| 3,524,512 A | * | 8/1970 | Barnowsky et al. | 180/14.1 |
| 3,648,869 A | * | 3/1972 | Christianson et al. | 280/33.991 |
| 4,052,084 A | * | 10/1977 | Propst | 280/408 |
| 4,128,137 A | * | 12/1978 | Booth | 180/6.5 |
| 4,221,273 A | * | 9/1980 | Finden | 180/6.48 |
| 4,361,200 A | * | 11/1982 | Igarashi | 180/14.4 |
| 4,368,793 A | * | 1/1983 | Igarashi | 180/14.4 |
| 5,117,521 A | * | 6/1992 | Foster et al. | 280/481 |
| 5,322,306 A | * | 6/1994 | Coleman | 280/33.992 |
| 5,429,290 A | | 7/1995 | Greene | |
| 5,439,069 A | * | 8/1995 | Beeler | 180/11 |
| 5,445,233 A | | 8/1995 | Fernie et al. | |
| 5,690,185 A | | 11/1997 | Sengel | |
| 5,934,694 A | * | 8/1999 | Schugt et al. | 280/33.991 |
| 6,705,624 B2 | | 3/2004 | Cassoni | |
| 6,729,421 B1 | * | 5/2004 | Gluck et al. | 180/11 |
| 6,832,884 B2 | | 12/2004 | Robinson | |
| 6,834,402 B2 | * | 12/2004 | Hanson et al. | 180/209 |
| 7,021,407 B2 | * | 4/2006 | Ruschke et al. | 180/11 |
| 2002/0063006 A1 | | 5/2002 | Kamen et al. | |
| 2003/0047362 A1 | | 3/2003 | Chernoff et al. | |
| 2004/0031630 A1 | | 2/2004 | Roach | |

* cited by examiner

*Primary Examiner*—Hau V Phan
(74) *Attorney, Agent, or Firm*—Pillsbury Winthrop Shaw Pittman LLP

(57) ABSTRACT

A utility vehicle having first and second vehicle modules and a method of operating a utility vehicle. The utility vehicle having a first vehicle module including a first vehicle body, a first plurality of wheels operatively connected with the first vehicle body, and a steering controller operatively connected for controlling at least one of the wheels among the first plurality of wheels. The second vehicle module including a second vehicle body and a second plurality of wheels operatively connected with the second vehicle body. The second vehicle body having a greater wheel spacing than that of the first vehicle body. Also, the second vehicle body being sized and configured to engage and carry the first vehicle body. The utility vehicle further having a control interface between the first vehicle module and the second vehicle module. The control interface enabling the steering controller of the first vehicle module to control at least one of the wheels among the second plurality of wheels of the second vehicle module.

14 Claims, 9 Drawing Sheets

US 7,464,776 B2

MOTORIZED VEHICLE

CROSS REFERENCE TO RELATED APPLICATION

This application claims priority to U.S. Provisional Application Ser. No. 60/689,054, filed Jun. 10, 2005, the entire contents of which are incorporated herein by reference.

FIELD OF THE INVENTION

The present invention relates to a motorized vehicle. More specifically, the present application illustrates embodiments of the present invention, including embodiments relating to motorized vehicles having multiple, operating modules.

BACKGROUND

U.S. Patent Application No. 2004/0031630 to Roach discloses a personal mobility vehicle and U.S. Pat. No. 5,429,290 to Greene, Jr. discloses a motorized golf cart. Each of U.S. Patent Application No. 2004/0031630 to Roach and U.S. Pat. No. 5,429,290 to Greene, Jr. is incorporated herein in its entirety by reference thereto, respectively.

SUMMARY OF THE INVENTION

One aspect of the invention relates to a utility vehicle, including, A) a first vehicle module including i) a first vehicle body, ii) a first plurality of wheels operatively connected with the first vehicle body, iii) a steering controller operatively connected for controlling at least one of the wheels among the first plurality of wheels; B) a second vehicle module, including i) a second vehicle body; ii) a second plurality of wheels operatively connected with the second vehicle body; the second vehicle body having a greater wheel spacing than that of the first vehicle body, the second vehicle body being sized and configured to engage and carry the first vehicle body; and C) a control interface between the first vehicle module and the second vehicle module, the control interface enabling the steering controller of the first vehicle module to control at least one of the wheels among the second plurality of wheels of the second vehicle module.

Another aspect of the invention relates to a method of using a utility vehicle, including, operating a first vehicle module that is physically separated from a second vehicle module, including operating a steering controller of the first vehicle module, the first vehicle module having a first vehicle body and a first plurality of wheels operatively connected with the first vehicle body, the steering controller operatively connected for controlling at least one of the wheels among the first plurality of wheels; positioning the first vehicle module into a locking engagement with the second vehicle module, the second vehicle module, including a second vehicle body, a second plurality of wheels operatively connected with the second vehicle body, the second vehicle body having a greater wheel spacing than that of the first vehicle body and the second vehicle body being sized and configured to engage and carry the first vehicle body; and operating the second vehicle module by operating the steering controller of the first vehicle module to control at least one of the wheels among the second plurality of wheels of the second vehicle module, the second vehicle module engaging and carrying the first vehicle body.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DESCRIPTION OF ILLUSTRATED EMBODIMENTS

Figure 1:
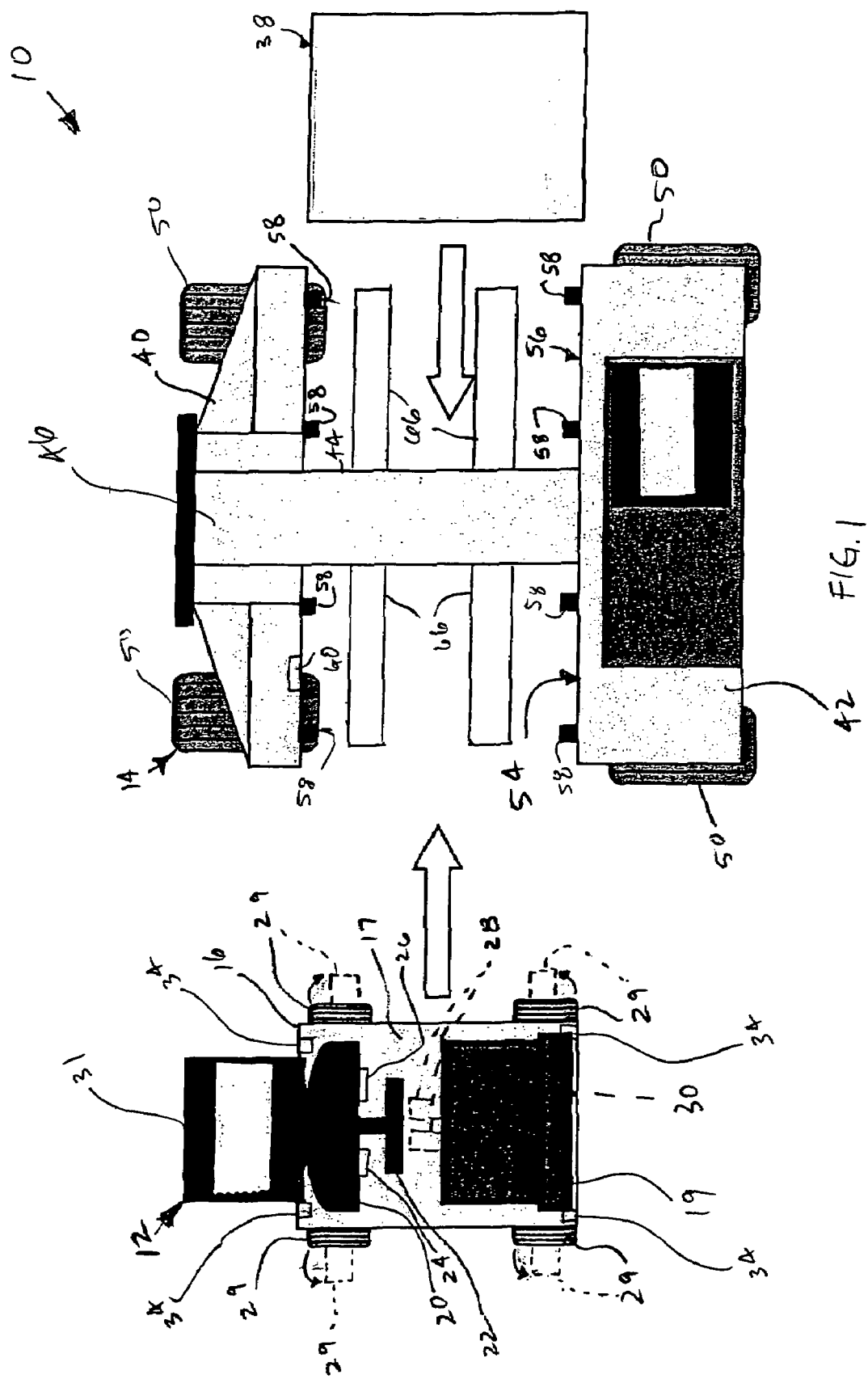
FIG. 1 illustrates a top view of a vehicle assembly according to one embodiment of the present application.

The principles of the invention are applicable in a variety of vehicle applications, including utility vehicles. FIGS. 1-7 illustrate one embodiment of the present invention in the form of a utility vehicle 10 with a first vehicle module in the form of a separable personal mobility module or personal module 12, and a second vehicle module in the form a main module 14. Personal module 12 provides the user with a motorized vehicle that permits high maneuverability. The personal module 12 capable of being releasably coupled to the main module 14, which provides the user with a larger motorized vehicle in which to travel. The coupling or docking of the personal module 12 with the main module 14 is such that the controls used for driving and operating the personal module 12 may be the same controls for driving and operating the main module 14. Thus, when using the personal module 12, the user is provided all of the maneuverability of personal mobility vehicles but the user is then capable of docking the personal module 12 into the main module 14 and is then provided with all of the benefits of a larger vehicle, such as a utility vehicle, a neighborhood electric vehicle, or golf cart.

In one embodiment, it is contemplated that main module 14 is capable of traveling at greater speeds and for longer distances (due to greater fuel capacity) than the personal module 12. In another embodiment contemplated, both modules may operate from the same power or fuel source (e.g., a battery) which is carried by the personal module 12.

The person module 12 can take a variety of forms but is illustrated basically as a scooter with a seat and controls for one individual. As a non-limiting example, the basic structure and configuration of personal module 12 may be similar to mobility vehicles such as those disclosed in U.S. Patent Application No. 2004/0031630 to Roach, which is incorporated herein by reference, as mentioned above. Personal module 12 includes a vehicle body 16, generally having a top surface 17 and a bottom surface 18. A seat 19 for the user is attached to the top surface 17. Adjacent the seat 19, for access by the user while seated, the top surface 17 also supports a controller assembly 20. The controller assembly 20 is functionally connected to a steering controller or steering wheel 22, a braking controller or brake pedal 24, and a powering controller or acceleration pedal 26. The personal module 12 is supported by wheels that permit the module 12 to have a high degree of maneuverability. It should be understood that the wheels supporting personal module 12 may take a variety of forms and configurations. One embodiment is as illustrated in FIGS. 1-7. The illustrated embodiment of FIGS. 1-7 show two powered wheels 28 positioned in the center of the module 12 and four caster wheels 29 spaced around the perimeter of the module 12 to provide support in all directions and range of movements. Powered wheels 28 may be individually powered by a motor 30 so that the module 12 can move forward, rearward, and rotate 360 degrees about a vertical axis. The caster wheels 29 follow the movement dictated by the powered wheels 28 and are configured to move 360 degrees around a vertical wheel support axis 33. The configuration of the wheels 28 and 29 in one embodiment, can be similar to that disclosed in U.S. Patent No. 5,445,233 to Fernie et al., which is incorporated herein in its entirety by reference thereto. Although six wheels are illustrate in the embodiment of FIGS. 1-7, various numbers (e.g., 3, 4 or 5) and configurations of wheels may be employed to support and provide movement to module 12. That is, the wheels supporting module 12 can take other forms as well, for example, such as similar to configurations disclosed in U.S. Pat. No. 5,690,185 to Sengel and U.S. Patent Application Serial No. US2002/0063006 to Kamen et al., each of which is incorporated herein in its entirely by reference thereto, respectively. Motor or engine 30 may be any appropriate power supplying device, such as an electric motor or a gas-powered engine. The controlling of the movement of the module 12, e.g., steering, powering, and braking, and the interconnections to perform the controlling of the movement of the module 12 can be constructed and arranged as is generally known.

Various additional elements may be included on the module 12, such as attachments to personal use. One illustrated attachment is a basket 31 for holding items for the user while driving the module 12. In order to permit the module 12 to be more compact when attaching to main module 14, the basket 31 can be removable and be configured for attachment to main module 14 as illustrated.

As mentioned above, the controlling devices, e.g., steering wheel 22, brake pedal 24, acceleration pedal 26, of the personal module 12 are preferably capable of being used to control the main module 14 as well, once the personal module 12 is attached. In order to accomplish this dual functionality of the controller devices of the personal module 12, a control interface element 32 may be coupled to controller 20, which, in turn, is coupled to each of the controller devices. The controller 20 is carried by the personal module and serves as the "brains" for the personal module 12 and main module 14. The controller 20 can be a computer similar to that used in conventional motor vehicles, but adapted for this particular application, or can be in the form of hardware, software, circuitry, electromechanical components, or any combination thereof. The interface element 32 may remain functionless when the personal module 12 is separated from the main module 14. However, once the modules 12 and 14 are coupled together, the interface element will provide a port for sending communications to the main module 14 to control movement of the main module 14. Although interface element 32 is illustrated as a device for physically contacting another interface element in main module 14, other remote, wireless interconnections between the controls of the personal module 12 and the main module 14 may be used. As seen schematically in FIG. 7, the interface element 32 and the controller 20 are coupled via typical electrical and mechanical connections 36 to the powered wheels 28 and to the motor or engine 30 and provides the control path from the controller 20 to, among other things, the propulsion system, the braking system, and the steering system. In order to physically couple the modules 12 and 14, personal module 12 also has appropriate coupling fasteners or devices 34 to rigidly secure and lock the personal module 12 to the main module 14.

Figure 10:
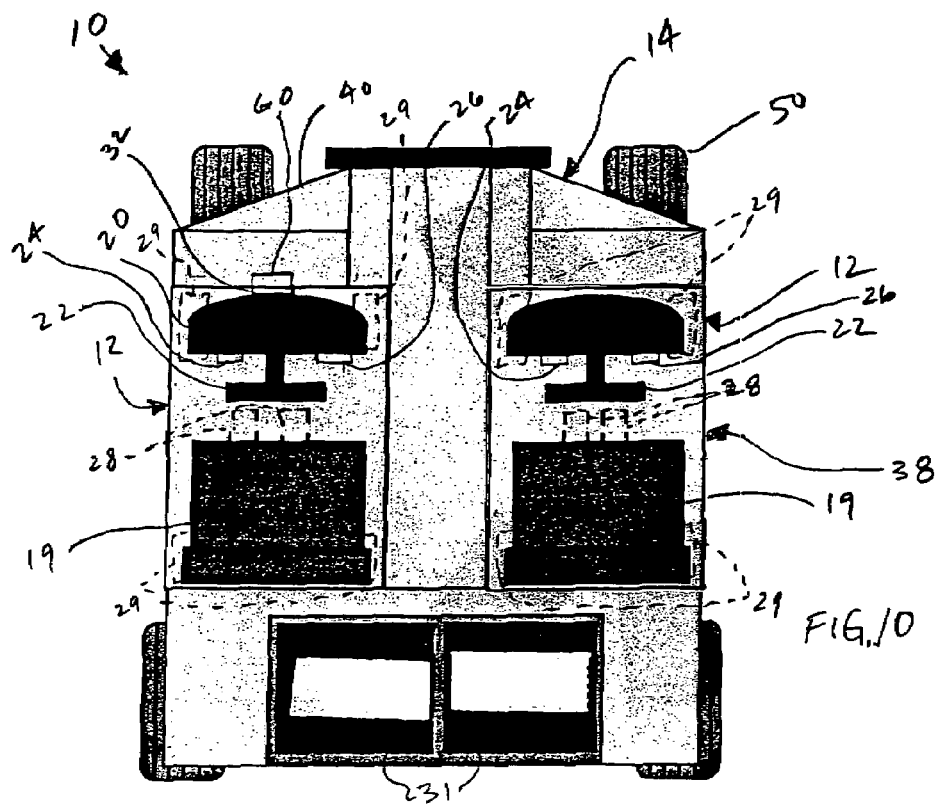
FIG. 10 is a top view of a vehicle assembly in accordance with another embodiment of the present application, with the two vehicles attached to the second vehicle.
Figure 11:
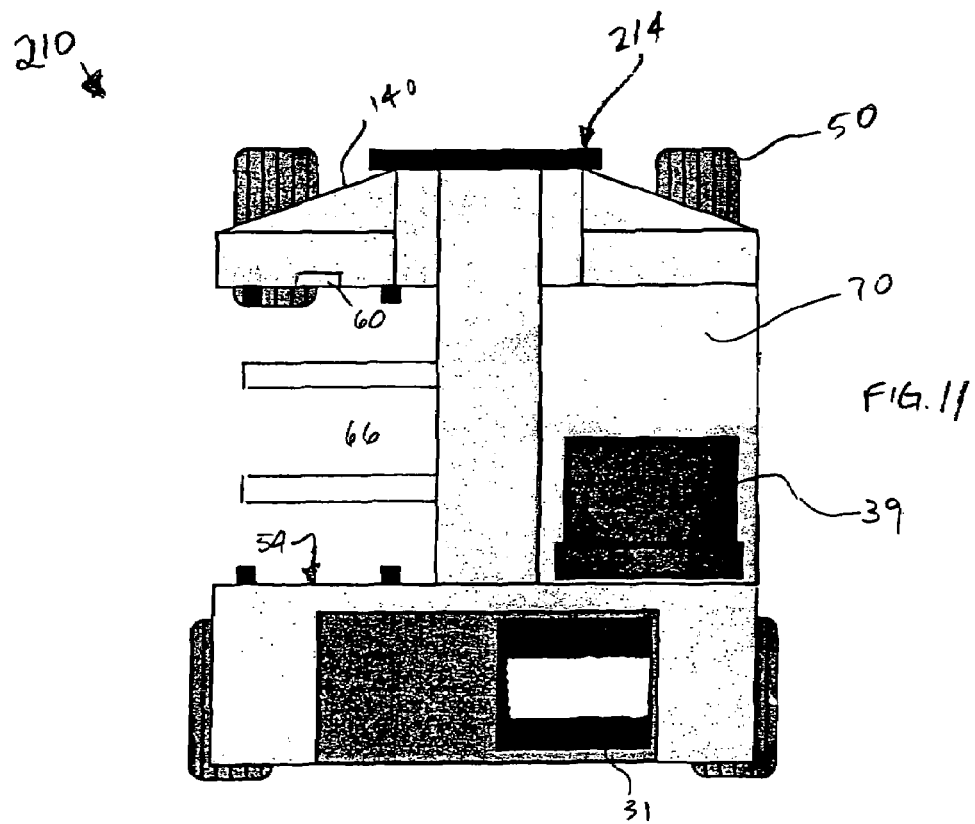
FIG. 11 is a top view of a vehicle assembly in accordance with yet another embodiment of the present application that employs a typical passenger seat.

The basic structure of the main module 14 including, for example, its main chassis, is generally that of a utility vehicle, golf cart, or neighborhood electric vehicle that is adapted to receive the personal module 12 on the driver's side of the main module 14. Also, according to some embodiments, the main module 14 may additionally receive a passenger's side module 38 as illustrated in FIG. 1. As described below, the passenger's side module 38 may take various forms including being substantially identical to personal module 12 as seen in FIG. 10. Thus, passenger side module 38 may include a vehicle body 16 and wheels 28 and 29. Passenger side module 38 may take different forms as well, such as providing extra cargo, or providing extra equipment, such as extra batteries. Further, as illustrated in FIG. 11, the passenger side module 38 may be omitted entirely and a typical, permanently attached passenger seat 39 may be used instead. The general construction of a golf cart-type utility vehicle is generally known in the art. U.S. Pat. No. 5,429,290 to Greene, Jr. discloses a retrofittable carrier for a golf cart and is incorporated herein by reference in its entirety.

The main module 14 has a vehicle body formed of forward section 40, a rear section 42, and mid section 44 coupled therebetween. The main module 14 also has an upper section 46 and a lower section 48. The entire body of the module 14 is supported by wheels 50 above the surface on which the vehicle modules 12 and 14 travel, such as the ground 52 so that the lower section 48 is spaced from the ground surface 52. The wheels 50 are illustrated as four wheels, but various numbers and configurations of wheels 50 are possible. Also, the width between two wheels 50 on opposite sides of the maim module 14 is illustrated as being greater than the width between any wheels 28, 29 or personal module 12. A driverside slot 54 for receiving the personal module 12 is bound on three sides by the forward section 40, the rear section, 42 and the mid section 44 and has an open side to permit entrance into the slot 54 by personal module 12. The illustrated embodiment of FIGS. 1-7 shows the forward and rearward sections of slots 54 and 56 as having coupling elements 58 that are structured to mate with the coupling elements 34 on personal module 12 for the purpose rigidly locking and releasably securing the personal module 12 to the main module 14. The coupling elements 34 and 58 can take various forms and can be appropriate, conventional coupling elements.

The forward sections of the driver-side slot 54 also has a control interface element 60 for interfacing with the controller 20 of personal module 12 via interface element 32 on personal module 12. The interface element 60 is electrically coupled to the operating systems, e.g., steering, propulsion, and braking systems, of the main module 14 and may provide the mechanism by which the signals from the controller 20 of the personal module 12 are provided to the main module 14. As seen schematically in FIG. 7, the interface element 60 is coupled via typical electrical and mechanical connections 64 to the wheels 50 and the motor or engine 62 and provides the control path to, among other things, the propulsion system, the braking system, and the steering system. Various configurations may be employed to control the operating systems of the main module 14 by using the controlling devices, e.g. steering wheel 22, back pedal 24, and acceleration pedal 26 of the personal module 12. One example of a configuration that may be employed to permit control of the main module 14 by the controlling devices of the personal module 12 is a system that uses electrical signals passed from the personal module 12 to the main module 14 for powering, driving, and controlling the main module 14. An example of such a system is illustrated in U.S. Patent Application Serial No. US2003/0047362 to Chernoff et al., which is incorporated herein in its entirety by reference.

The mid section of each slot 54 and 56 has one or more attaching members 66 that provide, if necessary, the lifting of the personal module 12 onto the main module 14, and weight balancing for the main module 14 when lifting the personal module 12. That is, in some embodiments of the vehicle 10 it may be preferred to physically lift the personal module 12 off the ground to disengage its wheels 28 and 29 from the ground 52 and place it onto the main module 14. In one embodiment it may be desirable to provide a balancing weight to the passenger's side of module 14 to compensate for the added weight of the personal module 12.

Figure 5:
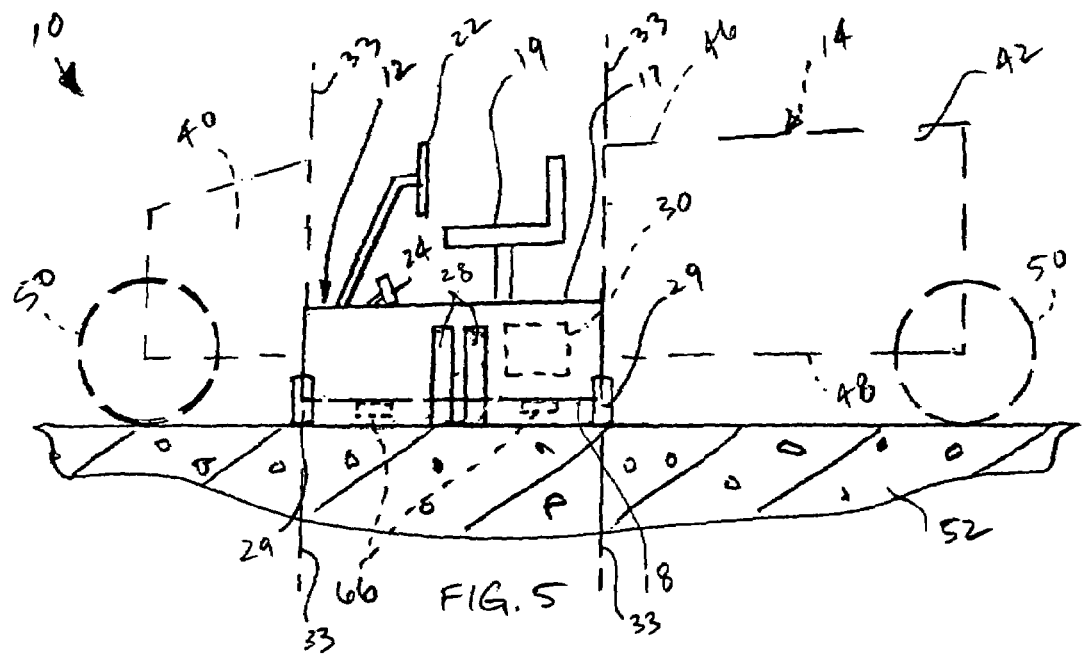
FIG. 5 illustrates a side view of the vehicle assembly of FIG. 1 with the wheels of the first vehicle resting on the ground.
Figure 6:
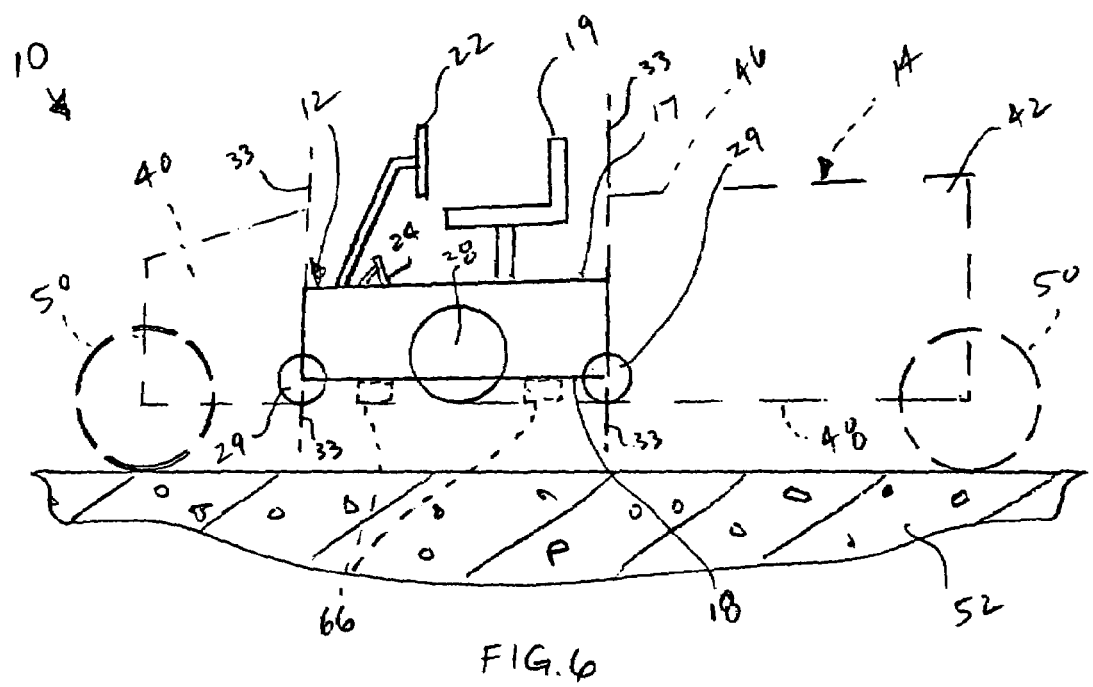
FIG. 6 illustrates a side view of the vehicle assembly of FIG. 1 with the wheels of the first vehicle raised off the ground.

As seen in FIGS. 5 and 6, the attaching members 66 may act like a lift, raising the personal module 12 off the ground 52 (as in FIG. 6) so that only the wheels 50 of the main module 14 are used when the main module 14 is driven. Various configurations of lifting mechanisms may be employed, such as a forklift-type mechanism using hydraulic cylinders. One example of a dual, hydraulic lifting device attached to a golf cart that may be adapted for lifting the personal module is disclosed in U.S. Pat. No. 6,705,624 to Cassoni, which is incorporated herein in its entirety by reference. More general lifting mechanisms that may be adapted for use in the vehicle 10 are illustrated in U.S. Pat. No. 6,832,884 to Robinson, which is also incorporated herein in its entirety by reference. Various other elements may be included within the main module 14, including providing a location in the rear section 42 for securing detachable baskets 31.

Figure 2:
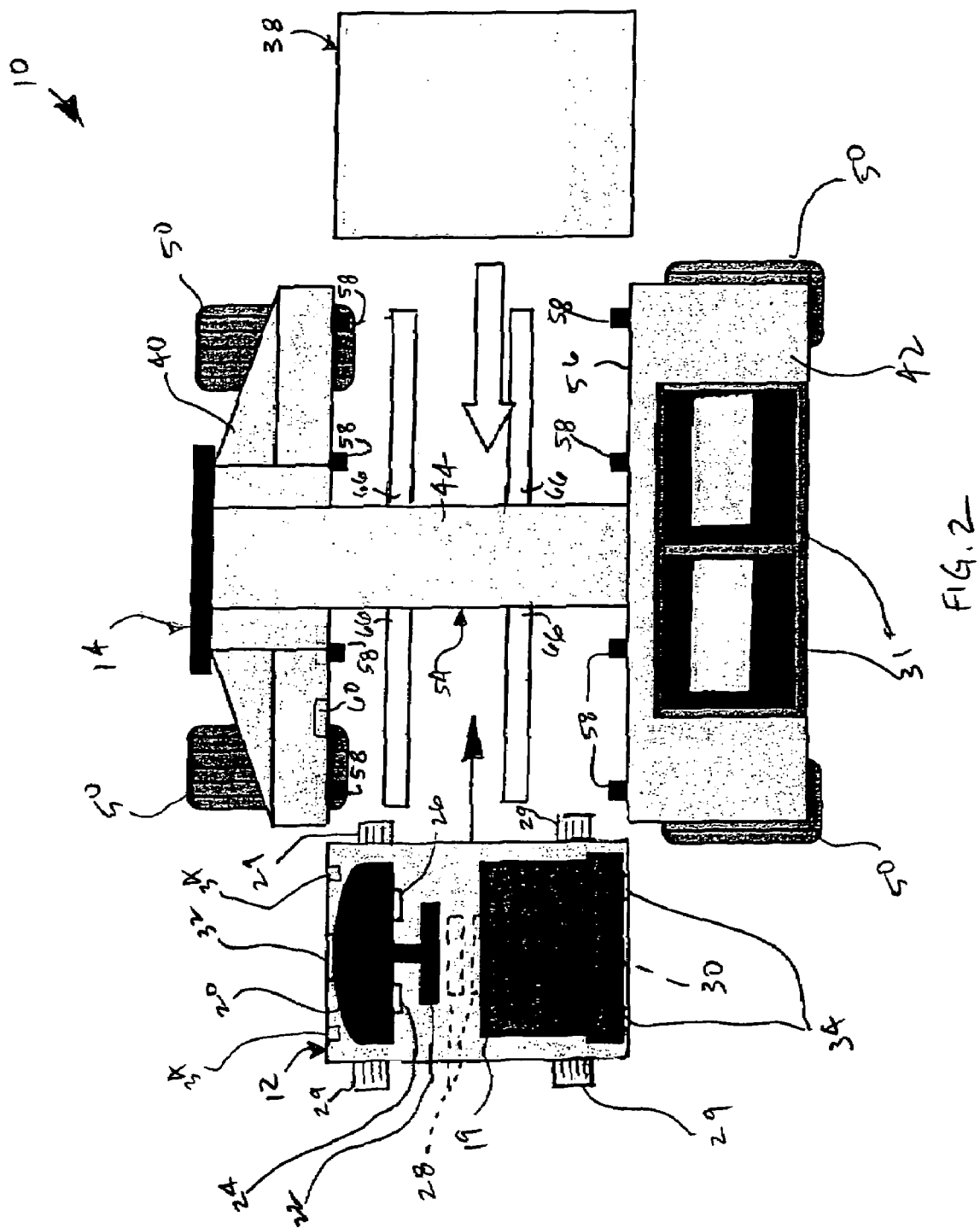
FIG. 2 illustrates the vehicle assembly of FIG. 1, but showing the first vehicle approaching the second vehicle.
Figure 3:
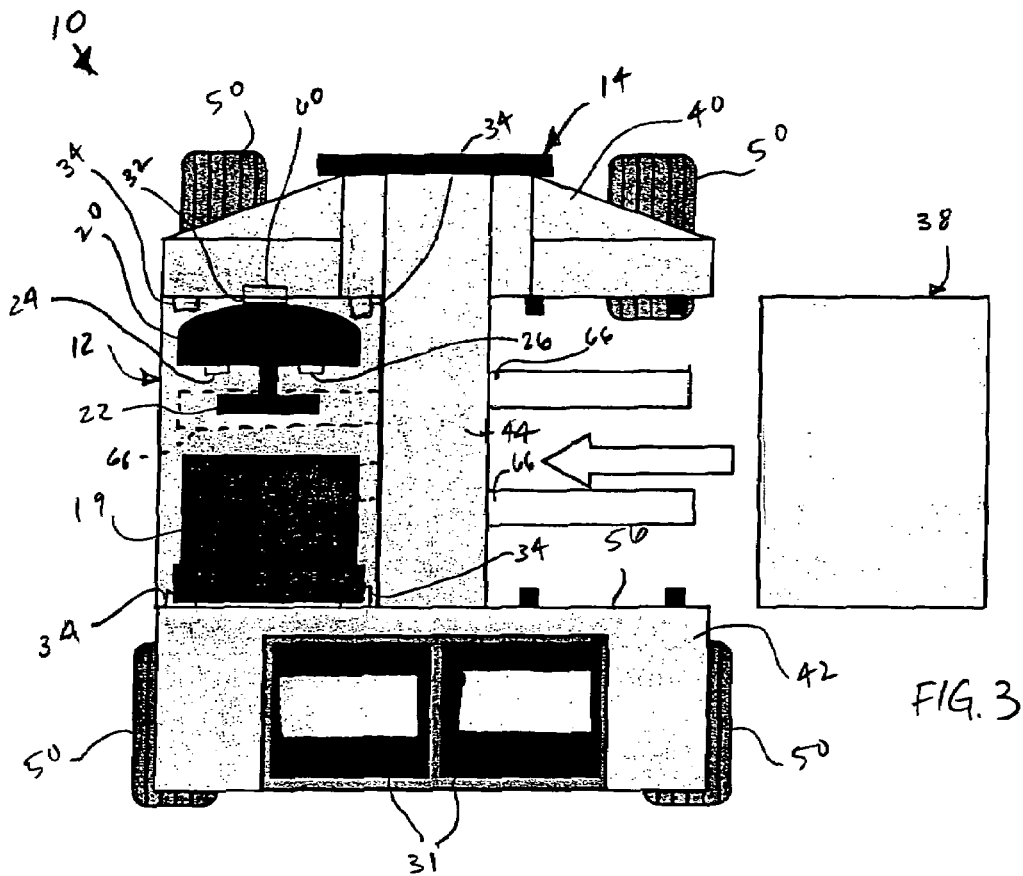
FIG. 3 illustrates the vehicle assembly of FIG. 1, but with the first vehicle attached to the second vehicle.
Figure 4:
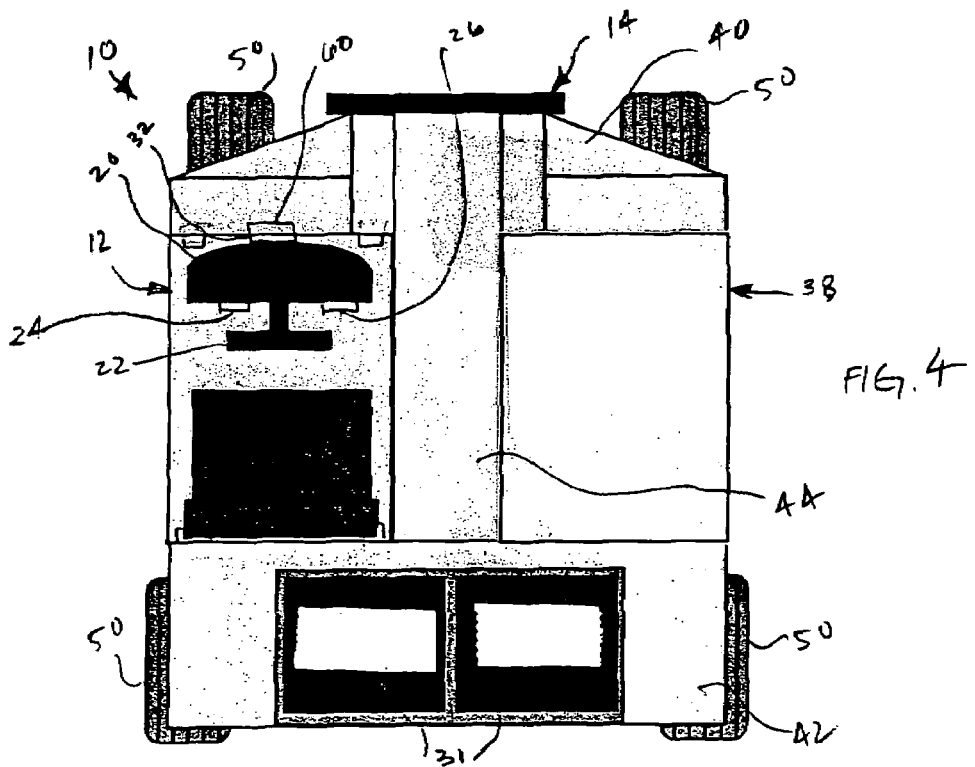
FIG. 4 illustrates the vehicle assembly of FIG. 1, but with the second attachment coupled to the second vehicle.
Figure 7:
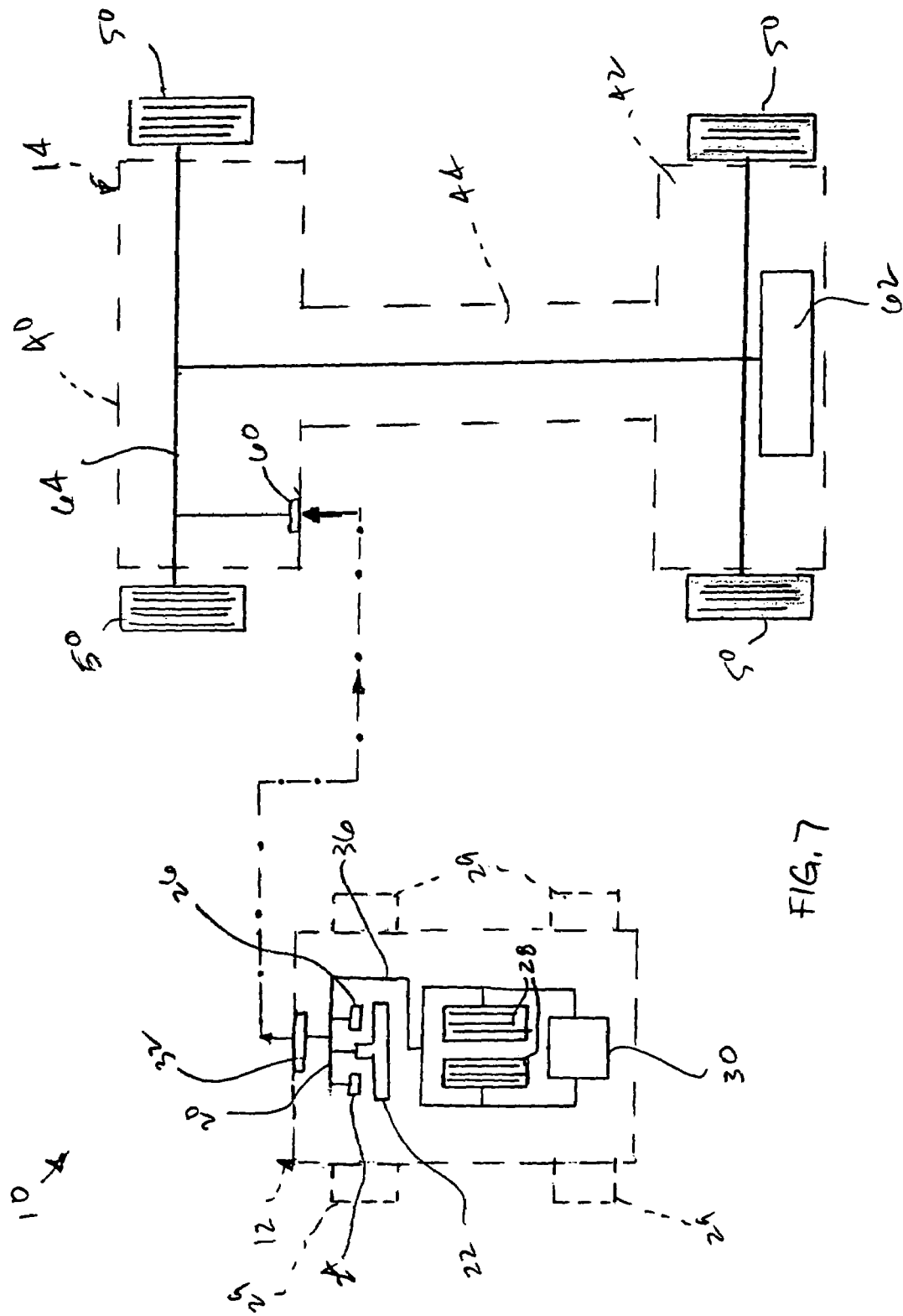
FIG. 7 is a schematic drawing of the vehicle assembly of FIG. 1 illustrating the interrelation between the power, braking and turning systems of the first and second vehicles.
Figure 8:
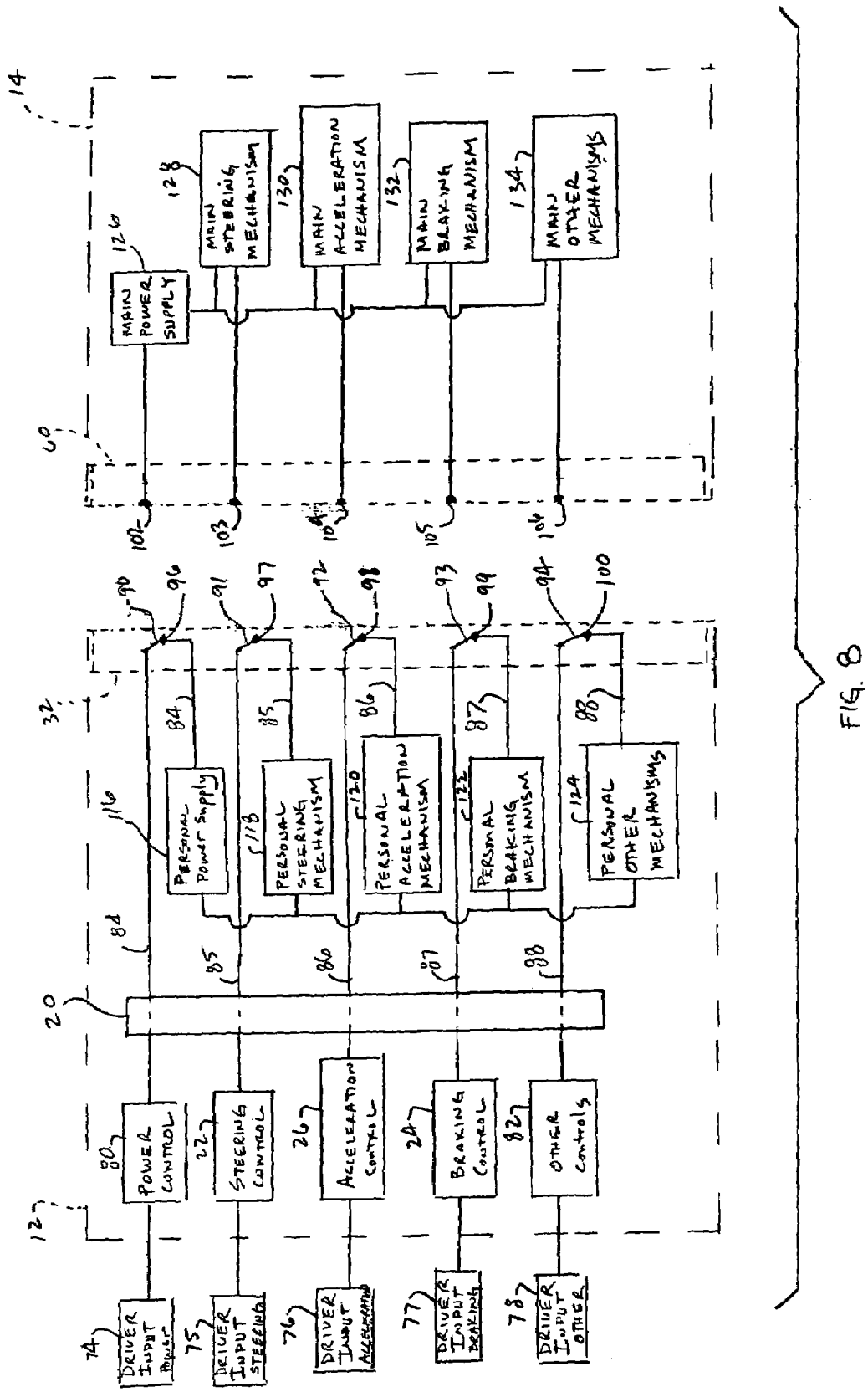
FIG. 8 is a schematic drawing of the electrical and control circuitry for the personal module and the main module while controlling the personal module as it is separated from the main module in accordance with one embodiment of the present application.

An example of one use of the embodiment of the vehicle 10 illustrated in FIGS. 1-7 includes the vehicle 10 being driven to a location such as a store wherein the main module 14 is left outside the store while the personal module 12 is used by an individual to drive inside the store where the mobility of the personal module 12 permits a very maneuverable vehicle 12. When it is desired to leave the store and return to the main module 14, the personal module 12 is driven to a position next to the main module 14 as seen in FIG. 1. The controls of the personal module 12, e.g., the steering wheel 22, brake pedal 24, and acceleration pedal 26, are used to control the module 12. If a basket 31 was used on the personal module 12, it can optionally be removed and attached to the rear of the main module 14. As seen in FIG. 2, the wheels 28 and 29 of the personal module 12 are then turned toward the main module 14 and the personal module is driven into the driver's side slot 54 until engagement with the main module 14, as seen in FIG. 3. At this point, the personal module 12 may still be contacting the ground 52 as illustrated in FIG. 5. As it is preferred to use the wheels 50 when operating the main module 14, the deactivation of the wheels 28 and 29 of the personal module 12 occurs next. As seen in FIG. 5, if a lifting mechanism is employed, the attaching members 66 may be positioned underneath the personal module 12 and appropriately positioned to act as, for example, the fork of a forklift. The attaching members 66 may extend outwardly from the midsection 44 into slots 54 and 56, respectively, as illustrated in FIG. 1. The portions of attaching members 66 at midsection 44 may be connected to a lifting mechanism. Then, as seen in FIG. 6, the attaching members 66 may lift the personal module 12 off the ground 52 so that the wheels 28 and 29 are deactivated and wheels 50 are then used to move main module 14. Of course, other mechanisms and methods may be employed to deactivate wheels 28 and 29 such as maintaining the personal module 12 in the position shown in FIG. 5 relative to the ground while retracting wheels 28 and 29 into the bottom 18 of the personal module 12. Regardless, once the personal module 12 is positioned in slot 54 and at the desired vertical position, the coupling elements 34 and 58 are engaged to releasably lock the personal module 12 rigidly to the main module 14. The locked position of the person module 12 will result in the mating connection between interface elements 32 and 60 so that an electrical connection exists between the two modules 12 and 14 as schematically shown in FIGS. 7 and 8. The operation of the controls, e.g., the steering wheel 22, brake pedal 24, and acceleration pedal 26, of the personal module 12 then are used to control the operation of the main module, including the acceleration, braking and steering of wheels 50.

As seen in FIG. 8, the driver makes particular inputs 74-78, such as physical inputs, to the various controls, including the power control 80, such as an ignition switch; the steering control or steering wheel 22; the acceleration control or acceleration pedal 26; the braking control or brake pedal 24; and any other desired controls 82. The controls 22, 24, 26, 80 and 82 then send a signal, such as a mechanical or electrical signal, to controller 20. Each signal sent to controller 20 corresponds to the respective input 74-78 made by the user. The controller 20, as mentioned above, may act as the "brains" of both the personal module 12 and the main module 14 and include a control system, for example, a computer such as those commonly found in automobiles to assist with the control of vehicle. Electronic control signals 84-88 are sent from the controller 20 to the interface element 32, which may include a series of switches 90-94 that receive the signals 84-88, respectively. In one position, as shown in FIG. 8, the switches 90-94 are connected to the personal module contacts 96-100, respectively, and in another position, shown in FIG. 9, the switches 90-94 are connected to the main module contacts 102-106, respectively. Any appropriate, known switch can be employed and it should be understood that the switches illustrated in FIG. 8 represent merely one type of switching connection that may be employed, and that other switching connections may be used, including remote switching connections that eliminate the need for interface elements 32 and 60 to physically contact one another.

As illustrated in FIG. 8, when the personal module 12 is not joined with the main module 14 and is being operated independently of the main module 14, the interface element 32 is separate from the interface element 60 of the main module 14 and the switches 90-94 forward the control signals 84-88 via contacts 96-100, respectively, to the appropriate personal module mechanism or device for receiving each control signal 84-88. For example, the steering control signal 85 is passed to the steering mechanism 118 controlling the wheels 28 of the personal module 12 while the power control signal 84 is forwarded to the power supply 116 of the personal module 12 so that appropriate power can be supplied to the steering mechanism 118, for example, if a power steering mechanism is employed. The acceleration mechanism 120, the braking mechanism 122, and the other mechanisms 124 of the personal module 12 are similarly controlled.

Figure 9:
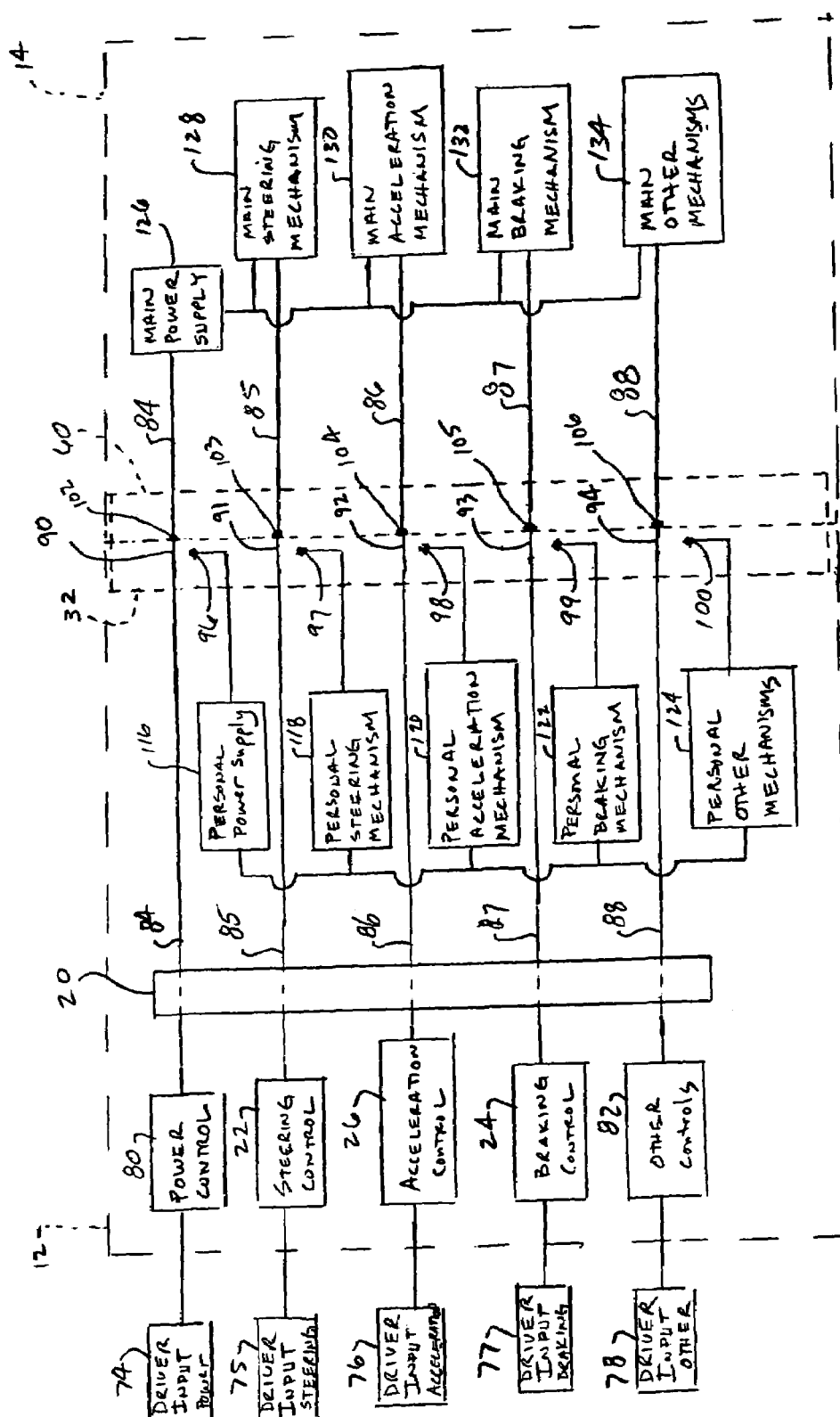
FIG. 9 is a schematic drawing of the electrical and control circuitry for the personal module and the main module while controlling the main module from the controls of the personal module in accordance with one embodiment of the present application.

As illustrated in FIG. 9, when the personal module 12 is coupled to the main module 14 and the interface element 32 of the personal module 12 is coupled to the interface element 60 of the main module, the switches 90-94 of the interface element 32 are switched from connecting to the personal module contacts 96-100 as in FIG. 8 to connecting to the main module contacts 102-106 as in FIG. 9. The activation of the switches 90-94 can occur in numerous ways including, for example, automatically switching upon contact between the two interface elements 32 and 60 or by a manual control activated by a user. Once the switches 90-94 connect to the main module contacts 102-106, respectively, the control signals 84-88 continue from the controller 20 to the corresponding mechanisms in the main module 14. That is, the steering control signal 85 is passed to the steering mechanism 128 controlling the wheels 50 of the main module 12 while the power control signal 84 is forwarded to the power supply 126 of the main module 12 so that appropriate power can be supplied to the steering mechanism 128, for example, if a power steering mechanism is employed. The acceleration mechanism 130, the braking mechanism 132, and the other mechanisms 134 of the personal module 12 are similarly controlled. Thus, the user inputs 74-78 to the controls 22, 24, 26, 80, 82 of the personal module 12 are sent to the mechanisms 128, 130, 132, 134 of the main module 14 so that the controls 22, 24, 26, 80 and 82 of the personal module 12 control the main module 14. As mentioned above, one alternative configuration is to have the personal power supply 116 provide power to the main module 14. In that instance, the personal power supply 116 would connect to the mechanisms 128, 130, 132 and 134 when the personal module 12 was coupled to the main module 14.

It also should be understood that other operations can be performed at the controller 20 of the personal module 12 once the connection between the interface elements 32 and 60 is made. For example, the user can use controller 20 in personal module 12 to operate the attaching members 66 and the coupling elements 34 and 58. Additionally, control of the various devices in main module 14 may be made remotely or wirelessly from personal module 12 without the use of interface elements 32 and 60. Such wireless connectivity can be used not only for steering, acceleration, and braking, but alternatively, or additionally for elements such as attaching members 66 and coupling elements 34 and 58, which may be remotely activated by the user from the personal module 12 in order to prepare the main module 14 for receiving the personal module 12 as it is driven into slot 54. When it is desired to use the personal module 12 by itself again, separate from the main module 14, the process is reversed. That is, the coupling elements 34 and 58 are disengaged, the attaching members 66 position the module 12 on the ground 52, and the module 12 is driven out of the slot 54.

The passenger side module 38 can be inserted into slot 56 in substantially the same manner as module 12. If the module 38 is a personal module that is substantially identical to module 12, the module 38 can be driven into slot 56. If the module 38 is not independently powered, it may be manually pushed into position and then locked into place in a manner substantially identical to that of module 12. FIG. 10 illustrates the embodiment of vehicle 10 wherein the passenger side module 38 is substantially identical to personal module 12.

FIG. 11 illustrates a vehicle 210 that is substantially identical to vehicle 10 above except that instead of having two slots for additional modules, the main module 214 only has one slot 54 for receiving personal module 12. Instead of a passenger side slot, vehicle 210 has the standard, permanent passenger seat 39 and associated permanent support 70. Thus, vehicle 210 would have a typical golf cart-type chassis except for the driver's side slot 54.

Figure 12:
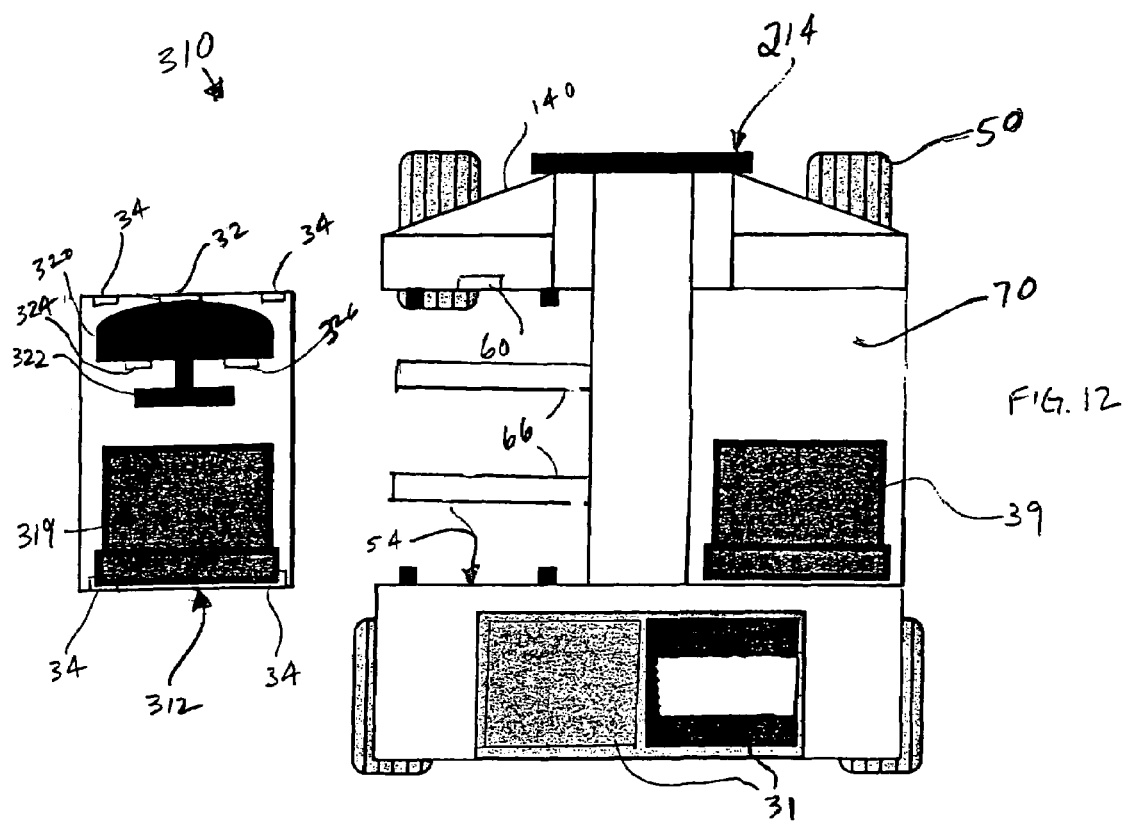
FIG. 12 is a top view of a vehicle assembly in accordance with yet another embodiment of the present application that employs a typical passenger seat and a control module to make the vehicle like a typical golf cart-type vehicle.
Figure 13:
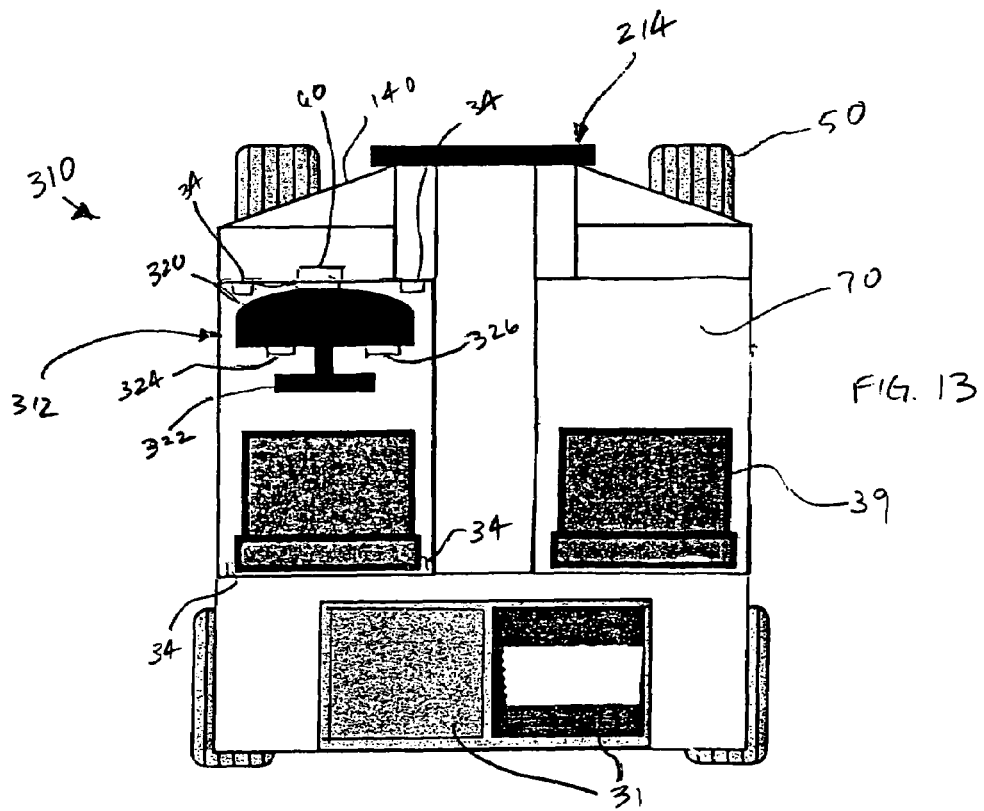
FIG. 13 is a top view of the vehicle assembly of FIG. 12, but with the control module attached to the main module.

FIG. 12 illustrates a vehicle 310 that is substantially identical to vehicle 10 described above, except that instead of having two slots for additional modules, the main module 214 only has one slot 54 for receiving a control module 312. Instead of a passenger side slot, vehicle 310 has the standard, permanent passenger seat 39 and associated permanent support 70. Thus, vehicle 310 would have a typical golf cart-type chassis except for the driver's side slot 54. Control module 312 may be configured so that it is merely a plug-in adapter permitting the vehicle 310 to operate substantially as a typical utility vehicle, such as a typical golf cart. The control module 312 may not have any wheels and, thus, may not have the mobility of or be a personal mobility vehicle as module 12 above. Control module 312 may plugs into the slot 54 and interconnect with main module 214 in a manner similar to that described above with respect to the module 12, but instead the control module 312 may be manually fitted into position in slot 54 instead of being rolled into slot 54 on wheels. A manually fitted control module 312 would necessary be sufficiently lightweight to be fitted into position by hand. Control module 312 may be a stationary driver's seat that would permit the vehicle 310 to function substantially like a typical utility vehicle, such as a typical golf cart. Thus, the control module 312, seat 319, steering wheel 322, brake 324, and acceleration pedal 326, etc., may look and operate substantially like those controls in a typical utility vehicle driver's seat area. The control connections, such as interface 32 and coupling element 34, between control module 312 and the main module 214 would be substantially the same as the control connections between the module 12 and main module 14 described above. Of course, other variations are possible. For example, the control module 312 may be used with a main module such as main module 46, which has two slots 54 and 56. The control module 312 may be inserted into slot 54 as described above and a passenger seat module may be inserted into the slot 56 to achieve a vehicle that is substantially identical in operation and appearance to vehicle 310.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A utility vehicle, comprising:
 A) a first vehicle module including
   i) a first vehicle body, ii) a first plurality of wheels operatively connected with said first vehicle body,
iii) a steering controller operatively connected for controlling at least one of said wheels among said first plurality of wheels;
B) a second vehicle module, including
i) a second vehicle body;
ii) a second plurality of wheels operatively connected with said second vehicle body;
said second vehicle body having a greater wheel spacing than that of said first vehicle body,
said second vehicle body being sized and configured to engage and carry said first vehicle body; and
C) a control interface between said first vehicle module and said second vehicle module, said control interface enabling said steering controller of said first vehicle module to control at least one of said wheels among said second plurality of wheels of said second vehicle module.

2. A utility vehicle according to claim 1, wherein each of said first and second vehicle modules include a motor.

3. A utility vehicle according to claim 1, wherein each of said first plurality of wheels is configured and arranged to pivot 360 degrees around a respective wheel support axis.

4. A utility vehicle according to claim 1, wherein said first vehicle module includes a powering and braking controller operatively connected for powering and braking at least one of said wheels among said first plurality of wheels, and
said control interface enabling said powering and braking controller of said first vehicle module to control the powering and braking of at least one of said wheels among said second plurality of wheels of said second vehicle module.

5. A utility vehicle according to claim 1, wherein said first vehicle module has a first seat and said second vehicle module has a second seat.

6. A utility vehicle according to claim 1, wherein said second vehicle module includes means for securing said first vehicle module to said second vehicle module.

7. A utility vehicle according to claim 1, further comprising:
a third vehicle module including a third vehicle body and a third plurality of wheels operatively connected with said third vehicle body.

8. A method of using a utility vehicle, comprising:
operating a first vehicle module that is physically separated from a second vehicle module, including operating a steering controller of the first vehicle module, the first vehicle module having a first vehicle body and a first plurality of wheels operatively connected with the first vehicle body, the steering controller operatively connected for controlling at least one of the wheels among the first plurality of wheels;
positioning the first vehicle module into a locking engagement with the second vehicle module, the second vehicle module, including a second vehicle body, a second plurality of wheels operatively connected with the second vehicle body, the second vehicle body having a greater wheel spacing than that of the first vehicle body and the second vehicle body being sized and configured to engage and carry the first vehicle body; and
operating the second vehicle module by operating the steering controller of the first vehicle module to control at least one of the wheels among the second plurality of wheels of the second vehicle module, the second vehicle module engaging and carrying the first vehicle body.

9. A method of using a utility vehicle according to claim 8, wherein the operating of the first and second vehicle modules includes depressing a pedal to provide power to the first and second plurality of wheels, respectively.

10. A method of using a utility vehicle according to claim 8, wherein the operating of the first vehicle module includes moving each of the wheels of the first plurality of wheels 360 degrees around a respective wheel support axis.

11. A method of using a utility vehicle according to claim 8, further comprising:
powering and braking at least one of the wheels among the first plurality of wheels by using a powering and braking controller of the first vehicle module, and
controlling the powering and braking of at least one of the wheels among the second plurality of wheels of the second vehicle module through the use of the powering and braking controller of the first vehicle module.

12. A method of using a utility vehicle according to claim 8, wherein the positioning of the first vehicle module in the second vehicle module includes deactivating the first plurality of wheels so that the first plurality of wheels are spaced from the surface on which the second plurality of wheels travels.

13. A method of using a utility vehicle according to claim 8, further comprising:
operating a third vehicle module that is physically separated from the second vehicle module including operating a steering controller of the third vehicle module, the third vehicle module having a third vehicle body and a third plurality of wheels operatively connected with the third vehicle body, the steering controller of the third vehicle module operatively connected for controlling at least one of the wheels among the third plurality of wheels; and
positioning the third vehicle module into a locking engagement with the second vehicle module so that the second vehicle module can engage and carry the third vehicle module.

14. A method of using a utility vehicle according to claim 8, further comprising:
removing the first vehicle module;
positioning a wheelless control module into a locking engagement with the second vehicle module; and
operating the second vehicle module by operating a steering controller of the control vehicle module to control at least one of the wheels among the second plurality of wheels of the second vehicle module, the second vehicle module engaging and carrying the control vehicle.

* * * * *